United States Patent
Bond et al.

(10) Patent No.: US 10,778,641 B2
(45) Date of Patent: Sep. 15, 2020

(54) MULTI-LEVEL SECURITY DEVICE

(71) Applicant: The Boeing Company, Chicago, IL (US)

(72) Inventors: William Earl Bond, St. Louis, MO (US); Ryan Hellar, Valley Park, MO (US); Greg A. Holtmeyer, Washington, MO (US); Patrick Albert Pekkarinen, Edwardsville, IL (US)

(73) Assignee: THE BOEING COMPANY, Chicago, IL (US)

( * ) Notice: Subject to any disclaimer, the term of this patent is extended or adjusted under 35 U.S.C. 154(b) by 297 days.

(21) Appl. No.: 15/441,120

(22) Filed: Feb. 23, 2017

(65) Prior Publication Data

US 2018/0241717 A1 Aug. 23, 2018

(51) Int. Cl.
*H04L 29/06* (2006.01)
*B64D 45/00* (2006.01)
(Continued)

(52) U.S. Cl.
CPC .............. *H04L 63/02* (2013.01); *B64D 45/00* (2013.01); *G06F 21/74* (2013.01);
(Continued)

(58) Field of Classification Search
CPC ....... H04L 63/02; H04L 67/12; H04L 63/105; H04L 41/0866; H04L 63/0227;
(Continued)

(56) References Cited

U.S. PATENT DOCUMENTS 8,990,560 B2  3/2015  Massey et al.
2003/0067542 A1*  4/2003  Monroe .................. H04N 7/181
                                                        348/148
(Continued)

FOREIGN PATENT DOCUMENTS

EP  2428910  3/2012
EP  2871814  5/2015

OTHER PUBLICATIONS

Anderson, Ross J., Security Engineering: A Guide to Building Dependable Distributed Systems, XP055444169, Apr. 14, 2008, pp. 239-274, [retrieved on Jan. 24, 2018]. Retrieved from the Internet: <URL http://www.cl.cam.ac.uk/~rja14/Papers/SEv2-c08.pdf>.

*Primary Examiner* — Yogesh Paliwal
(74) *Attorney, Agent, or Firm* — Haynes and Boone, LLP

(57) ABSTRACT

A multi-level security system may include multiple independent processors each configured to independently process data respectively from or for a different security level. For example, the multi-level security system may process data being communicated between aircrafts of different security levels. The multi-level security system may also include a configurator processor configured to manage and control the operations of the multiple independent processors. The configurator processor and the multiple independent processors may be provided and connected to each other on one single board computer to reduce the size, weight, and power requirement of the multi-level security system and to reduce the power requirement. A cross domain filter device also may be provided to filter and upgrade/downgrade data between different security levels.

23 Claims, 10 Drawing Sheets

(51) Int. Cl.
*G06F 21/74* (2013.01)
*H04W 4/46* (2018.01)
*H04L 12/24* (2006.01)
*H04L 29/08* (2006.01)

(52) U.S. Cl.
CPC ...... *H04L 41/0866* (2013.01); *H04L 63/0227* (2013.01); *H04L 63/0245* (2013.01); *H04L 63/105* (2013.01); *H04L 63/20* (2013.01); *H04W 4/46* (2018.02); *G06F 2221/2113* (2013.01); *H04L 67/12* (2013.01)

(58) Field of Classification Search
CPC ...... H04L 63/0245; H04L 63/20; H04W 4/46; B64D 45/00; G06F 21/74; G06F 2221/2113
See application file for complete search history.

(56) References Cited

U.S. PATENT DOCUMENTS

| | | | |
|---|---|---|---|
| 2012/0047364 A1* | 2/2012 | Levy | H04L 63/105 713/166 |
| 2012/0066509 A1* | 3/2012 | Lapp | G06F 21/606 713/189 |
| 2012/0311314 A1* | 12/2012 | Cumming | G06F 21/51 713/2 |
| 2012/0324222 A1 | 12/2012 | Massey et al. | |
| 2014/0111390 A1* | 4/2014 | Carides | H01Q 1/2216 343/705 |
| 2014/0170601 A1* | 6/2014 | Wokurka | G09B 9/02 434/35 |
| 2015/0135254 A1 | 5/2015 | Thilenius et al. | |
| 2016/0173987 A1 | 6/2016 | Ford | |

* cited by examiner

MULTI-LEVEL SECURITY DEVICE

BACKGROUND

Technical Field

The present application generally relates to multi-level security devices. In particular, it relates to multi-level security devices configured to support communication in multi-level security networks.

Related Art

Multi-level security systems may implement communication across networks with different security levels. A Cross Domain Solution (CDS) interface may ensure secure transfer of data between different security levels. The CDS interface may filter, upgrade, or downgrade data being transmitted between different security levels to ensure that the transmitted data complies with security policies associated with the different security levels. For example, a CDS interface may receive a message sent from a first aircraft with a first security level for a second aircraft with a second security level. The CDS interface may filter and upgrade/downgrade the message from the first security level to the second security level before forwarding the message to the second aircraft.

Based on certain security policies (e.g., the Bell-LaPadula security model), data from different security levels are required to be processed and/or stored separately. As such, conventional CDS may require multiple, discrete, external devices which would increase the overall size, weight, and/or power requirements of the system. In an avionic system, where space is limited and reductions in weight and power consumption are desired, there is a need for an improved CDS with reduced size, weight, and/or power requirements.

SUMMARY

Systems and methods are disclosed herein in accordance with various embodiments that provide for a multi-level security system that may include multiple independent processors each configured to independently process data respectively from or for a different security level. The multi-level security system may also include a configurator processor configured to manage and control the operations of the multiple independent processors. In particular, the configurator processor may set the security levels and coordinate the startup of various components of the multi-level security system. Further, the configurator processor may monitor the health of various components of the multi-level security system including the multiple independent processors, any other attached mezzanines. The configurator processor may halt the operations of the system if certain components are not functioning properly and may communicate with a trusted remote process. The communication with the trusted remote process may be facilitated via a designated network proxy for the network communications and secure inter-processor communication provided by the hardware. The configurator processor and the multiple independent processors may be provided and connected to each other on a single circuit module to reduce the size, weight, and power requirement of the multi-level security system. A cross domain filter device, e.g., a cross domain guard, also may be provided to filter and up/downgrade data between different security levels.

According to an embodiment, a system for multi-level security communication is described. The system may include a first independent hardware processor configured to process data for a first vehicle designated with a first security level and a second independent hardware processor configured to process data for a second vehicle designated with a second security level. The system also may include a configurator processor configured to coordinate the first and the second independent hardware processors to process data being communicated between the first vehicle designated with the first security level and the second vehicle designated with the second security level.

According to another embodiment, a method for multi-level security communication is described. The method may include processing, by a first independent hardware processor, data for a first vehicle designated with a first security level and processing, by a second independent hardware processor, data for a second vehicle designated with a second security level. The method also may include coordinating, by a configurator processor, the first and the second independent hardware processors to process data being communicated between the first vehicle designated with the first security level and the second vehicle designated with the second security level.

The first independent hardware processor, the second independent hardware processor, and the configurator processor may be provided and connected to each other on a circuit board module installed at the second vehicle.

The system may be configured to receive a data packet from the first vehicle, the data packet designated for transmission to the second vehicle, process the data packet via the first independent hardware processor in the first security level before the data packet is filtered for the second security level, process the data packet via the second independent hardware processor in the second security level after the data packet is filtered for the second security level, and transmit the data packet to the second vehicle in the second security level. The first and second vehicles may be aircrafts communicating via a wireless communication.

The system may further include a cross domain filter device configured to filter data between the first security level and the second security level. The second security level may have a different security requirement from the first security level. The cross domain filter device may be configured to upgrade or downgrade data from the first security level to the second security level.

The system may include a network interface configured to receive data from one or more vehicles with different levels of security. The system also may include a first security policy component configured to process security policy of received data in the first security level and a second security policy component configured to process security policy of received data in the second security level.

The system may further include a third independent hardware processor configured to process data in a third security level and a fourth independent hardware processor configured to process data in a fourth security level.

The configuration processor is further configured to verify configurations of the first and the second independent hardware processors in a device start-up process.

The system may further include an edge network interface configured to receive secured data from a secured network and transmit the secured data directly to the first independent hardware processor bypassing a security policy component.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
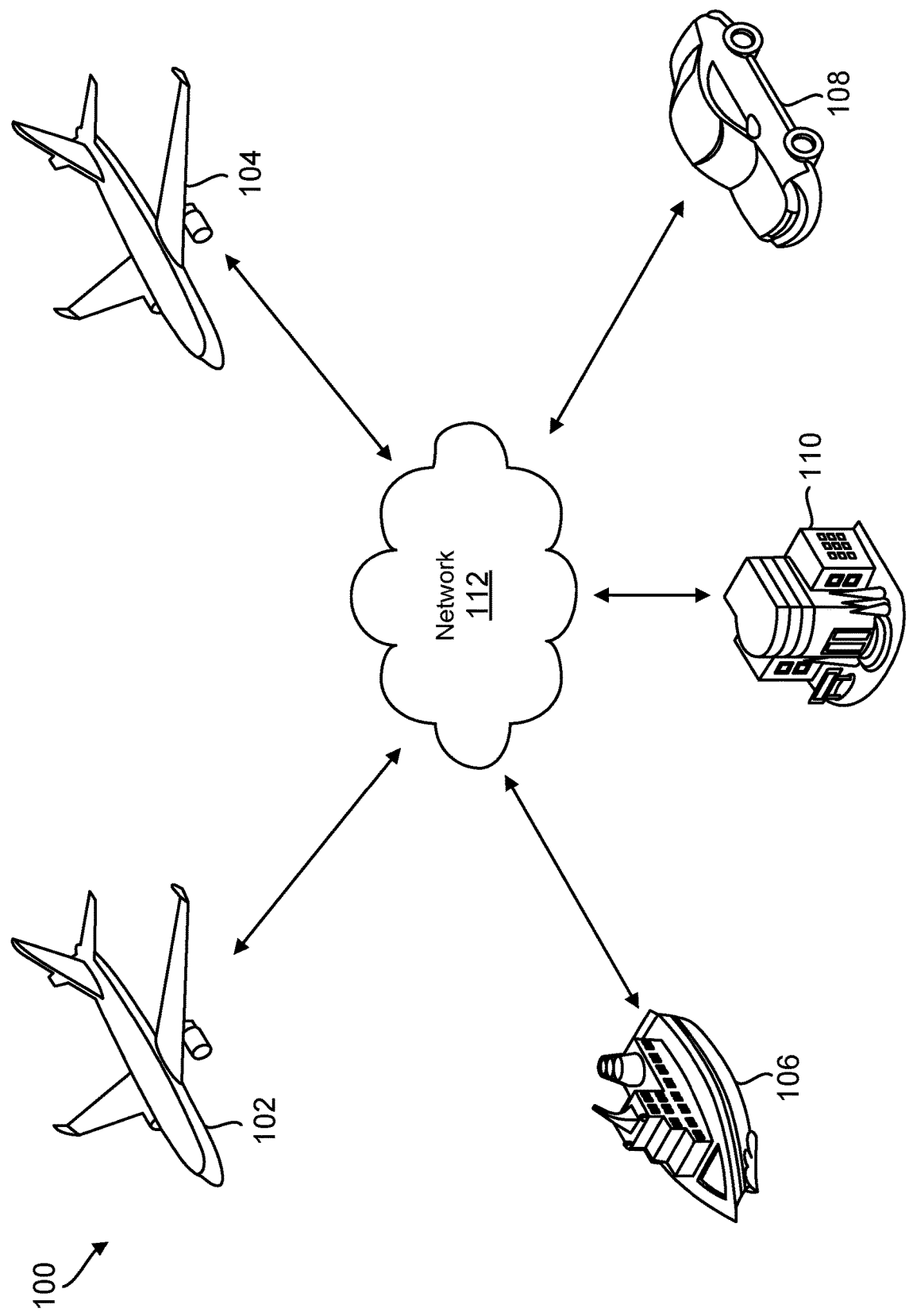
FIG. 1 is an overview diagram of a multi-level security network including various entities with different security levels according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments of the present disclosure provide systems and methods for implementing communication and processing in multi-level security networks. In particular, a more compact and power saving multi-level security system may be achieved by providing multiple independent hardware processors and a configurator processor on the same circuit board module.

Each independent hardware processor may be designated for processing data for a particular security level. The configurator processor may manage and control the operations of the multiple independent hardware processors. As such, various components and devices for processing communication in multi-level security networks may be integrated into one circuit board module to allow for space saving and reductions in weight and power requirement.

FIG. 1 is an overview diagram of a multi-level security network 100 including various entities with different security levels according to an embodiment of the present disclosure. Multi-level security network 100 may include multiple entities with different security levels communicating with each other. For example, the multiple entities may include vehicles, such as aircraft 102, aircraft, 104, ship 106, and car 108. The multiple entities also may include non-vehicles, such as a communication center 110. The multiple entities may belong to different security levels. The multiple entities may communicate via a communication network 112.

Communication network 112 may include a wireless network, such as a wireless telephone network, a local wireless network, such as a Wi-Fi network, a Bluetooth network and the like. Network 112 also may include one or more of a wide area network ("WAN"), a storage area network ("SAN"), a local area network ("LAN), an optical fiber network, the internet, or other data network known in the art. In some embodiments, network 112 may include radio communication and/or infrared communication. Network 112 may include two or more sets of connected networks. Network 112 may also include various components and devices, such as servers, routers, switches, and other network equipment.

In multi-level security network 100, one or more of the entities may each include a multi-level security system configured to process data received from different security levels and upgrade/downgrade the data to an appropriate security level of the receiving entity. For example, aircraft 102 may be designated in a first security level and aircraft 104 may be designated in a second security level. Aircraft 102 may send a message to aircraft 104. Aircraft 104 may include a multi-level security device configured to process the message from aircraft 102 in the first security level, filter (upgrade/downgrade) the message from the first security level to the second security level, and process the filtered message in the second security level ready to be transmitted to and received by aircraft 104. Thus, the multi-level security system may ensure that the communication between aircrafts 102 and 104 comply with the security polices of both the first and the second security levels. In particular, the multi-level security system may ensure physical separation of data from different security levels.

In some embodiments, an entity may operate internally at multiple security levels. For example, an aircraft may have avionic components, such as sensors, radios, and the like, that operate at different security levels. The aircraft may have a multi-level security device that allows for processing of internal communication in multiple security levels without data spillage.

The multi-level security system may be included with an avionic system of an aircraft and installed within a fuselage of the aircraft. In some embodiments, the multi-level security system may be included with an add-on system, such as a pod installed underneath a fuselage of the aircraft. In other embodiments, the multi-level security system may be installed at different portions of the aircraft based on the conditions and requirements of a particular application, such as the temperature, vibration/shock, and altitude conditions. In some embodiments, the multi-level security system may be adapted to withstand harsh environmental conditions when installed in a chassis for airborne tactical platforms. For example, the multi-level security system may satisfy the environmental requirements of Class ECC4 in the VITA 47 specifications. The multi-level security system may be provided at various types of aircrafts, such as a fighter jet, a commercial airline, a bomber, a cargo plane, a surveillance plane, a rotorcraft, an aerial drone, a spacecraft, and the like, to provide multi-level security communication for the aircraft. In other embodiments, the multi-level security system may be provided on ground-based vehicles such as automobiles and trucks. In still other embodiments, the multi-level security system may be provided in a static location such as a communications facility in communication with corresponding aircrafts and ground-based vehicles with the multi-level security system.

Figure 2:
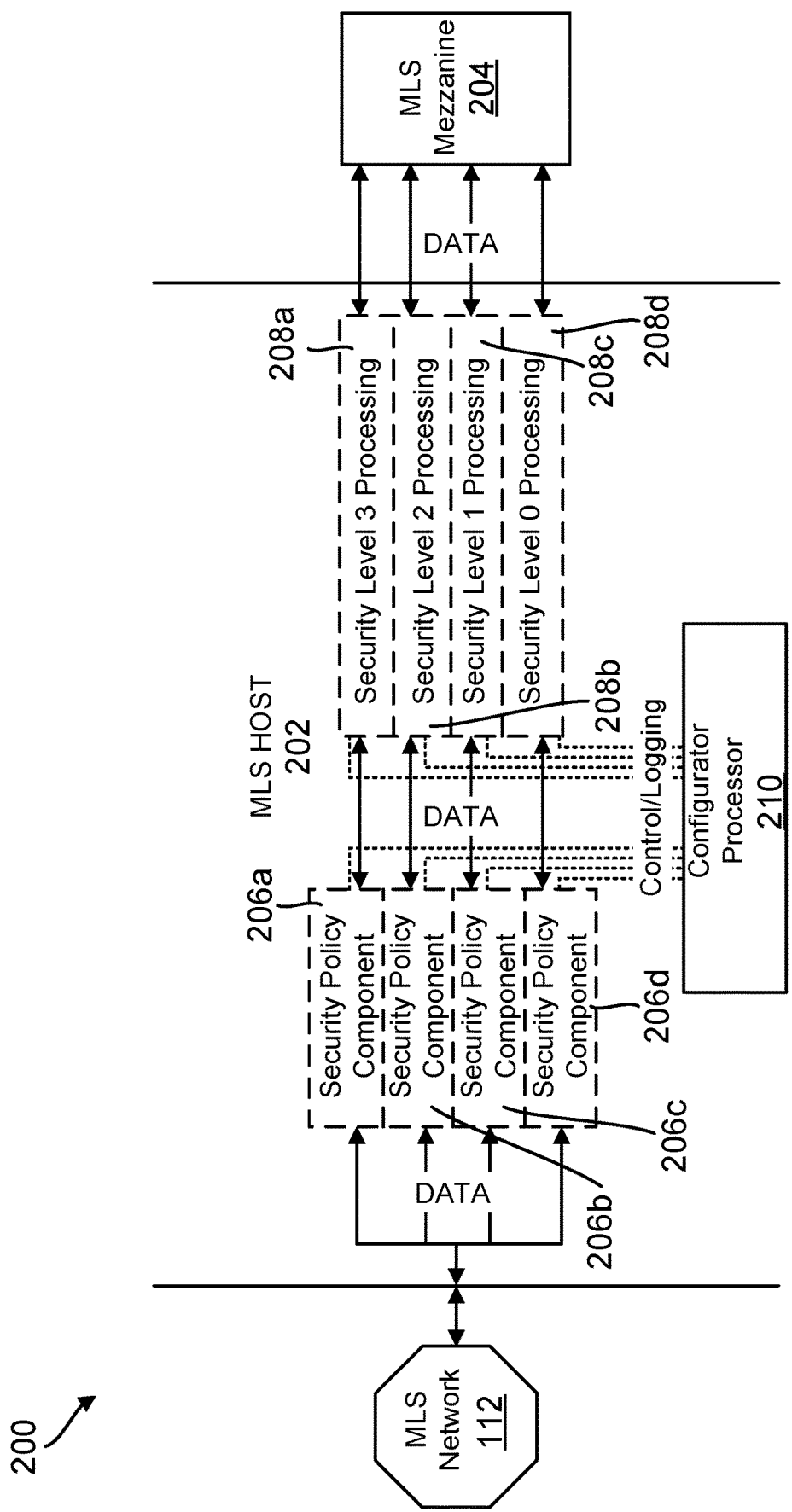
FIG. 2 is a functional block diagram of a multi-level security system according to an embodiment of the present disclosure.

FIG. 2 is a functional block diagram of a multi-level security system 200 according to an embodiment of the present disclosure. Multi-level security system 200 may include a Multi-Level Security (MLS) host portion 202 and a Multi-Level Security (MLS) mezzanine portion 204. Multi-level security host 202 may communicate with other entities in the multi-level security network 112. Data received from multi-level security network 112 may be processed based on their security levels.

Multi-level security host 202 may include security policy components 206a-206d, security level processing units 208a-208d, and a configurator processor 210. Each security policy components 206a-206d may be designated to verify data in a particular security level. In particular, security policy components 206a-206d each may verify a particular security level's labels, such as FIPS-188 type security labels. For example, security policy component 206a may be designated for verifying data in security level 3, security policy component 206b may be designated for verifying data in security level 2, security policy component 206c may be designated for verifying data in security level 1, and security policy component 206d may be designated for verifying data in security level 0.

Security level processing units 208a-208d may each be implemented with an independent hardware processor each including an independent memory. Each security level processing unit 208a-208d may be designated to process and verify data in a particular security level. For example, security level processing unit 208a may be designated for processing data in security level 3, security level processing unit 208b may be designated for processing data in security level 2, security level processing unit 208c may be designated for processing data in security level 1, and security level processing unit 208d may be designated for processing data in security level 0.

Configurator processor 210 may manage and control operations of security policy components 206a-206d and security level processing units 208a-208d. When data is received from multi-level security network 112 at multi-level security host 202, the data may be routed to the appropriate security policy component based on the security level of the received data. For example, data from an entity with security level 3 may be routed to security policy component 206a, which is designated for processing and verifying security policy for data of security level 3. If a security label of the data is not verified, the data may be rejected and an error log may be created at configurator 210. If the security label of the data is verified, the data may be written to security level processing unit 208a, which is designated for processing data in security level 3. Based on the destination of the data, the data may be forwarded to a cross domain guard, e.g., multi-level security mezzanine 204. Multi-level security mezzanine 204 (cross domain guard) may be configured to filter and upgrade/downgrade the data from the origination security level to the destination security level. For example, if the data from security level 3 is destined for an entity in security level 1, multi-level security mezzanine 204 may filter and downgrade the data from security level 3 to security level 1. The filtered/downgraded data may then be written to security level processing unit 208c, which is configured to process data in security level 1. The filtered/downgraded data may be processed and verified by security policy component 206c, which is configured to verify data in security level 1. For example, security policy component 206c may apply a security label for security level 1 to the data. After verification, the filtered/downgraded data may then be transmitted to the destination entity via MLS network 112.

Accordingly, data from different security levels may be processed separately by different sets of security policy components and security level processing units. This may ensure compliance of security policy with regard to physical separation of data from different security levels. MLS host 202 in FIG. 2 may include security policy components and security level processing units that allow for processing of data from four different security levels. In other embodiments, different numbers of security policy components and security level processing units may be provided to allow for processing data from different number of security levels, such as two, three, five, six, seven, eight, or any number of different security levels, based on the requirements of the applications.

The multiple independent processors provided in MLS host 202 may allow for simultaneous processing of multiple instances of data. For example, configurator processor 210 may configure the multiple independent processing units 208a-208d to simultaneously process multiple messages transmitted from different entities to different destinations. As such, multi-level security host 202 may simultaneously process multiple messages with improved efficiency. Further, the multiple independent processors provided in MLS host 202 may ensure physical separation of data from different security levels in compliance with security policies of respective security levels.

Figure 3:
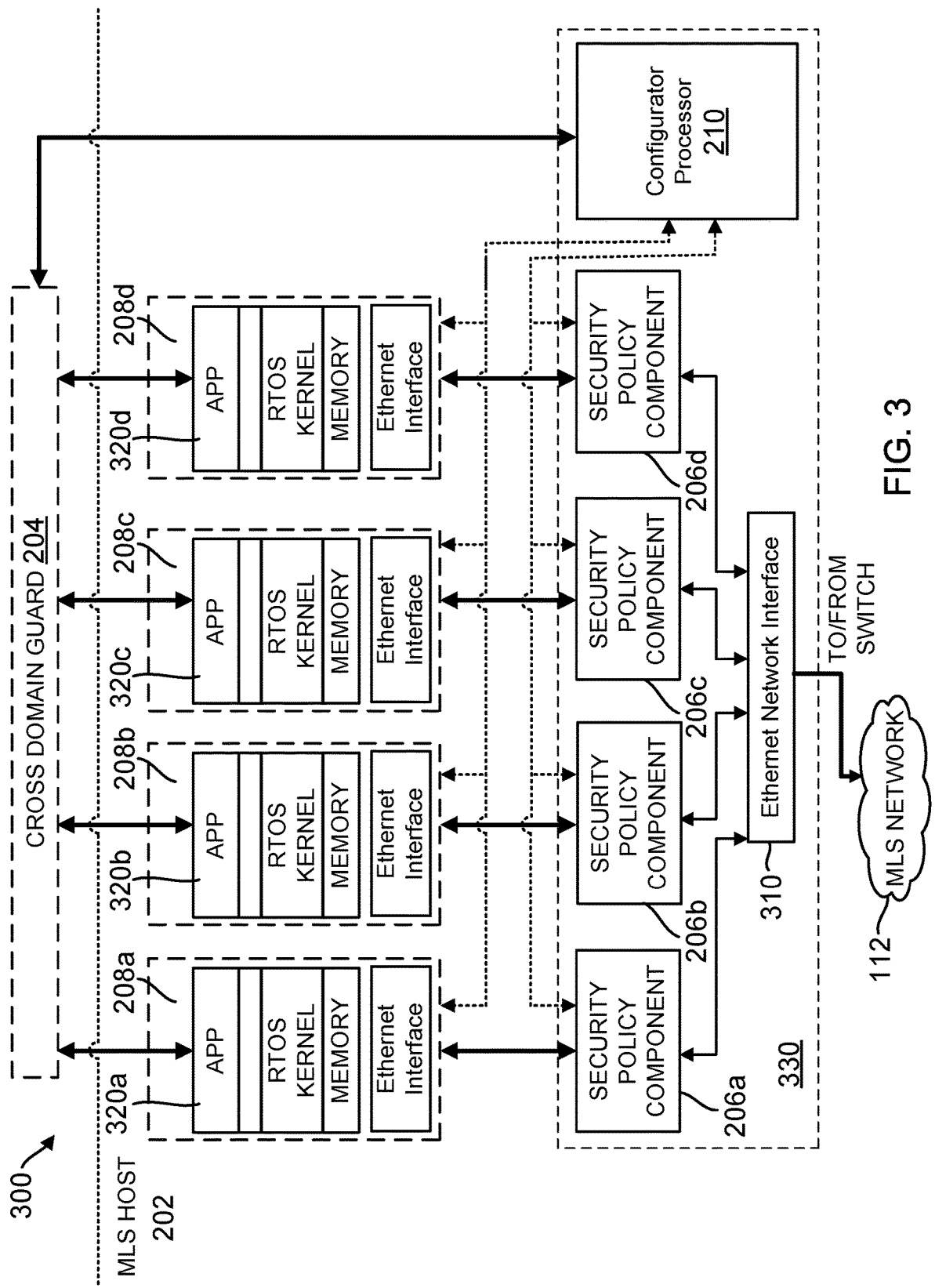
FIG. 3 is a block diagram of a multi-level security device according to an embodiment of the present disclosure.

FIG. 3 is a block diagram of a multi-level security device 300 according to an embodiment of the present disclosure. Portions of multi-level security device 300 may correspond to portions in multi-level security system 200 shown in FIG. 2. FIG. 3 provides additional description for certain components of MLS host 202 and MLS mezzanine 204.

As shown in FIG. 3, configurator unit 330 may include security policy components 206a-206d and a configurator processor 210. Configurator processor 210 may be a hardware processor including processing memory and stored logics and/or applications configured to implement operations and functions related to configurator unit 330. Security policy components 206a-206d may be implemented by integrated circuits, such as an Application-Specific Integrated Circuits (ASIC) or Field-Programmable Gate Array (FPGA) circuits. Configurator unit 330 also may include an Ethernet network interface 310 configured to receive and/or transmit data with multi-level security network 112.

Configurator processor 210, e.g., trusted configurator, may implement configuration and run-time monitoring for various components of MLS host 202. In some embodiments, configurator processor 210 also may implement configuration and run-time monitoring for a cross domain guard, e.g., MLS mezzanine 204. For example, configurator processor 210 may communicate configuration data and status with various components of multi-level security device 300.

Each of security level processing units 208a-208d may respectively include one of independent hardware processors 320a-320d. As shown in FIG. 3, each of independent hardware processors 320a-320d may include a driver, applications, a Real Time Operation System (RTOS) Kernel, and a memory. Each of security level processing units 208a-

208*d* also may include an Ethernet interface serving as communication interface. Thus, each of security level processing units 208*a*-208*d* may have independent hardware/software components and communication interface to ensure that data from different security levels are processed and stored separately.

Each of security level processing units 208*a*-208*d* may serve as a network proxy acting as a network endpoint for applications that utilize the MLS host 202. In particular, each of security level processing units 208*a*-208*d* may implement a network stack. Applications may establish a TCP/UDP network socket connection to transfer data to and receive data from the MLS host 202. Independent hardware processors 320*a*-320*d* may then forward or receive data from cross domain guard, e.g., corresponding to MLS mezzanine 204. Each of security level processing units 208*a*-208*d* may also support the transfer of configuration data/results required by the configurator unit 210 to and from the network.

Cross domain guard 204 may correspond to MLS mezzanine 204 in FIG. 2. In some embodiments, cross domain guard 204 may be implemented by a VITA 42.0 compliant XMC Mezzanine card. Cross domain guard 204 may provide a set of data filters that are applied to data flows between different security levels.

Figure 4:
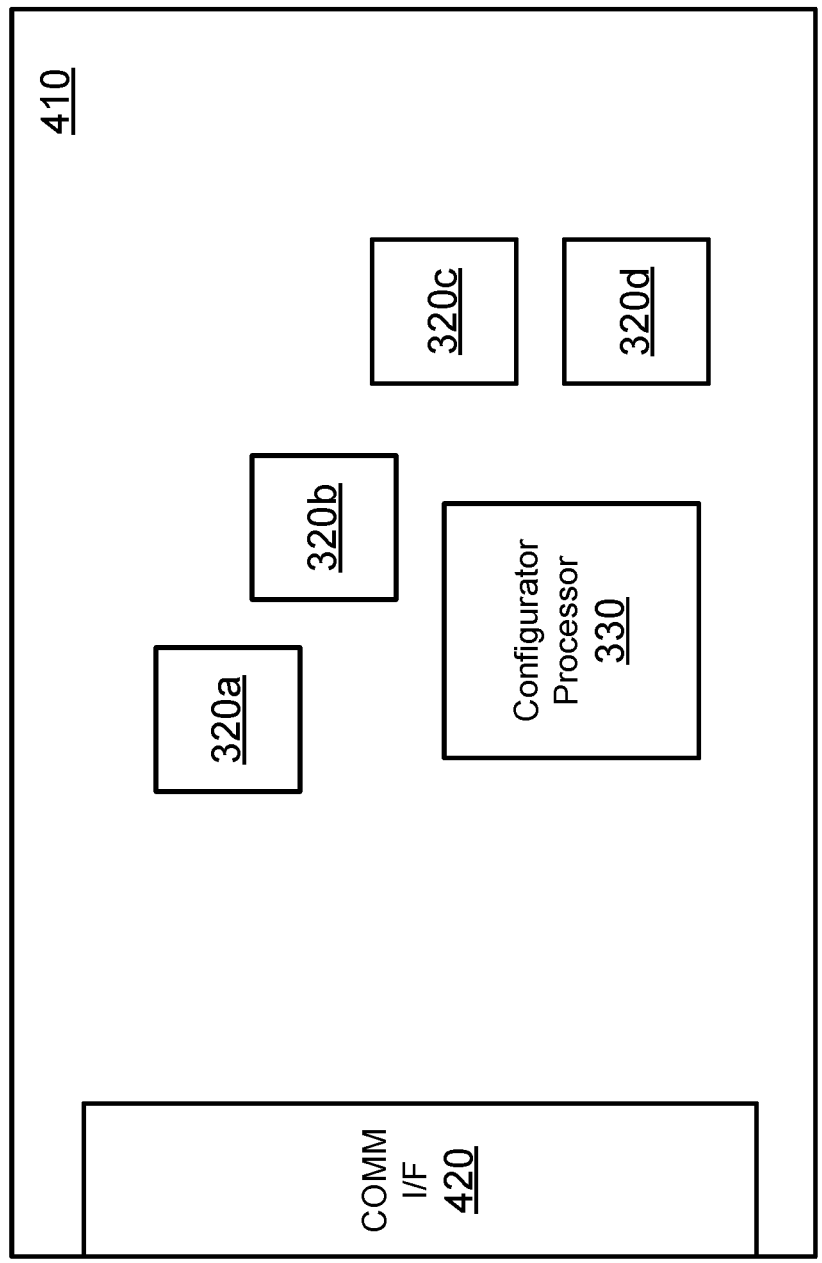
FIG. 4 is a block diagram of a circuit module provided with a multi-level security device according to an embodiment of the present disclosure.

FIG. 4 is a block diagram of a MLS host module 410 provided with MLS host 202 according to an embodiment of the present disclosure. As shown in FIG. 4, configurator processor 210 and independent hardware processors 320*a*-320*d* may be provided on the same MLS host module 410. Although not shown in FIG. 4, security policy components 206*a*-206*d*, transceiver interface 420, other circuit components and circuit interconnections also may be provided on MLS host module 400 as integrated circuits, e.g., FPGA and/or ASIC. Thus, MLS host module 410 may allow various devices and components for the CDS interface to be provided on a compact circuit module to achieve reduction in size, weight, and power requirement of MLS host module 410. For example, the MLS host module 410 may have a length of approximately 6.7 inches, a width of approximately 4 inches, and a height of approximately 1 inch. As such, the MLS host module 410 may be configured to be inserted into a one inch pitch slot. Accordingly, the compact MLS host module 410 may be applicable for use in avionic systems, such as aircrafts, satellites, space crafts, or the like, where space is limited and reductions in weight and power requirement are desired.

In some embodiments, the MLS host module 410 may be implemented by a 3U VPX Plug-In module including a MLS network interface 310. The 3U VPX Plug-In module may be compatible to support and host the VITA 42.0 compliant XMC Mezzanine card acting as a cross domain guard 204. Thus, the MLS host module 410 and the XMC mezzanine card may combine to form a Cross Domain Solution (CDS) module. The MLS host module 410 may maintain data separation by providing independent hardware processors for different security levels. The MLS host module 410 may support the configuration of both the MLS host module 410 and the XMC mezzanine. The MLS host module 410 may be used in concert with a 3U VPX MLS Switch Plug-in Module.

Figure 5:
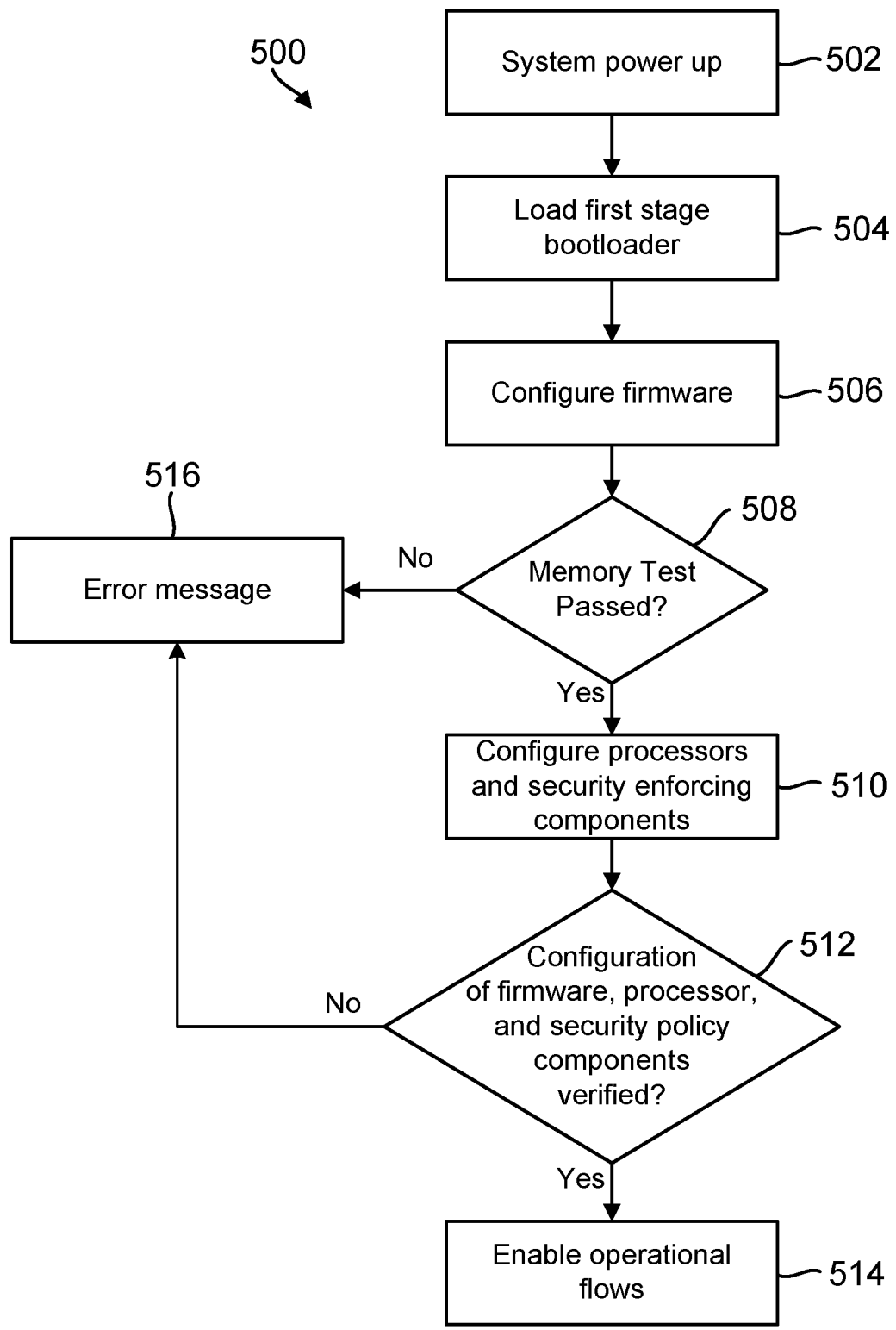
FIG. 5 is a flow chart illustrating a start-up process of a multi-level security system according to an embodiment of the present disclosure.

FIG. 5 is a flow chart illustrating a start-up process 500 of multi-level security system 300 according to an embodiment of the present disclosure. At step 502, the system may be powered up after connecting to power or after being turned on or started. At step 504, the system may load first stage bootloader, such as initial instructions/values for the startup process. At step 506, the system may configure system firmware based on initial application parameters/design of the system. At step 508, the system may perform a memory test to determine whether the system memory, e.g., SDRAM memory, is operational. If the system memory fails the test, the system may generate a SDRAM fail error message at step 516 and may stop the startup process. If the system memory passes the test, at step 510, the system may configure the processors and security enforcing components, such as independent hardware processors 320*a*-320*d*, configurator processor 330, and security policy components 206*a*-206*d*. In particular, the system may load initial values, logics, and each of their specific applications to configure these components.

At step 512, configurator processor 330 may verify whether the system firmware, processors, and security policy components are configured correctly. If not verified, the system may stop the startup process and create an error log to record issues at step 516. If verified, the configurator processor 330 may enable operational flows at step 514, allowing the multi-level security system to begin processing data for communication in multi-level security network.

After the startup process, the configurator processor 330 may periodically and/or continuously monitor the health of the respective components of the multi-level security system 300 including other attached mezzanines. The configurator processor 330 may halt the operations of the multi-level system 300 if certain components are not functioning properly and may log and/or communicate system errors with a trusted remote process.

Figure 6:
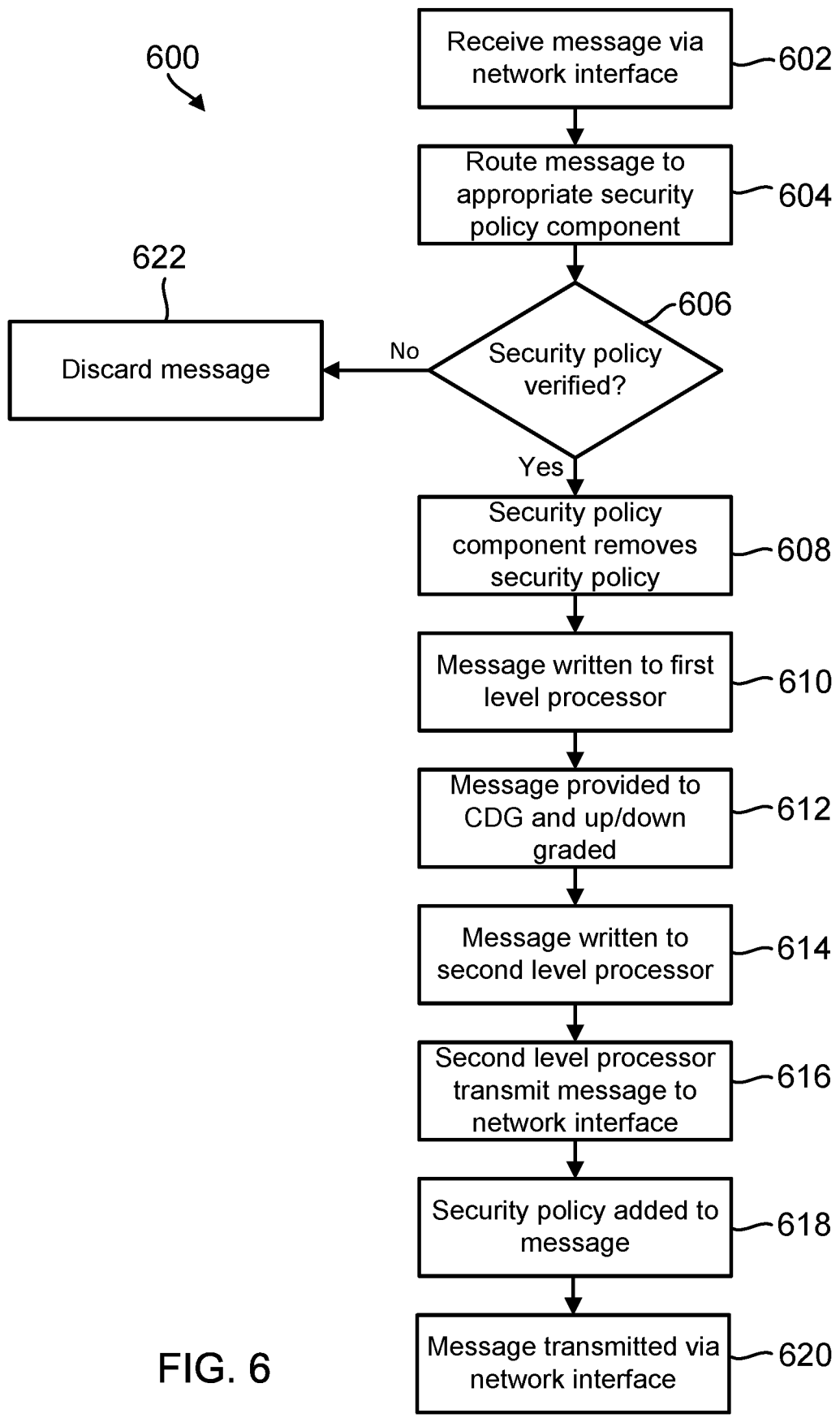
FIG. 6 is a flow chart illustrating a method for transmitting data between different security levels according to an embodiment of the present disclosure.

FIG. 6 is a flow chart illustrating a method 600 for transmitting data between different security levels according to an embodiment of the present disclosure. At step 602, MLS host 202 may receive a message, e.g., a data packet, via network interface 310. The message may be originated from an entity associated with a first security level. The message may be for transmission to another entity associated with a second security level. The message may include one or more of various data types and/or formats, such as text formats, image formats, video formats, audio formats, and the like.

At step 604, the message may be routed to an appropriate security policy component based on the originating security level of the message. The message may be routed based on the MAC address included with the message. For example, if the message has a first security level, the message may first be routed to a security policy component that is designated for processing and verifying incoming messages in the first security level.

At step 606, the security policy component may verify the security policy associated with the message. For example, the security policy component may read a security label included in the message, such as a security label corresponding to Federal Information Processing Standards Publication 188. The security policy component may determine whether the security label is valid. If the security label is not valid, the security policy component may discard the message at step 622 and may create an audit record in an audit log to record the error.

If the security policy is verified at step 606, the security policy component may remove the security policy, e.g., security label, included in the message at step 608. At step 610, the security policy component 206*a*-206*d* may write the message to the corresponding independent hardware processors 208-208*d*. For example, a message in security level 1 may be written to independent hardware processor 320*c*, which is designated for processing data in security level 1 and a message of security level 3 may be written to independent hardware processor 320a, which is designated for processing data in security level 3.

At step 612, the message may be forwarded to the cross domain guard, e.g., CDG 204, to be filtered. At CDG, the message may be filtered and up/downgraded to comply with the security policy of the destination security level. In particular, CDG 204 may perform one or more filtering operations by comparing the message to one or more rules associated with the message, such as the rules of the originating security level of the message and the rules of the destination security level where the message is to be transmitted. The rules may include one or more requirements and constraints that determine values/parameters the message should contain in order to be forwarded from the originating security level to the destination security level.

In some embodiments, CDG 204 may perform low-level data inspection to examine the message at the byte and/or bits level and compare bytes and/or bits to one or more rules defining what each byte and/or bit filed should be to comply with the rules of the destination security level. In some embodiments, CDG 204 may modify the message type, format, and/or style, remove sensitive data, e.g., by zeroing out certain data fields, and/or make other changes to the message to up/down grade the message from the originating security level to the destination security level. After the message has been filtered at CDG 204, at step 614, the message may be written to an independent hardware processor designated to process data in the destination security level, to which the filtered message is to be transmitted. At step 616, the filtered message may be forwarded to network interface. At step 618, a security policy component may add a new security label to the filtered message assigning the filtered message to the new security level. The filtered message may then be transmitted to the receiving entity at step 620.

Accordingly, the four-processor MLS host 202 may provide cross domain solution for up to four different security levels. Messages or data packets may be received, verified, and processed to be transmitted across different security levels. In other embodiments, MLS host 202 may be provided with different numbers of independent hardware processors and configurations to support communication between different numbers of security levels.

In some embodiments, MLS host 202 may allow for multiple instances of cross domain communication to be processed simultaneously. For example, a message may be processed from security level 0 to security level 3 while another message may be processed from security level 2 to security level 1 at the same time. Because each independent hardware processors 320a-320d may process data independently, configurator processor 330 may configure each of them to process different instances of cross domain communication simultaneously. This may allow for increased processing efficiency and throughput.

Figure 7:
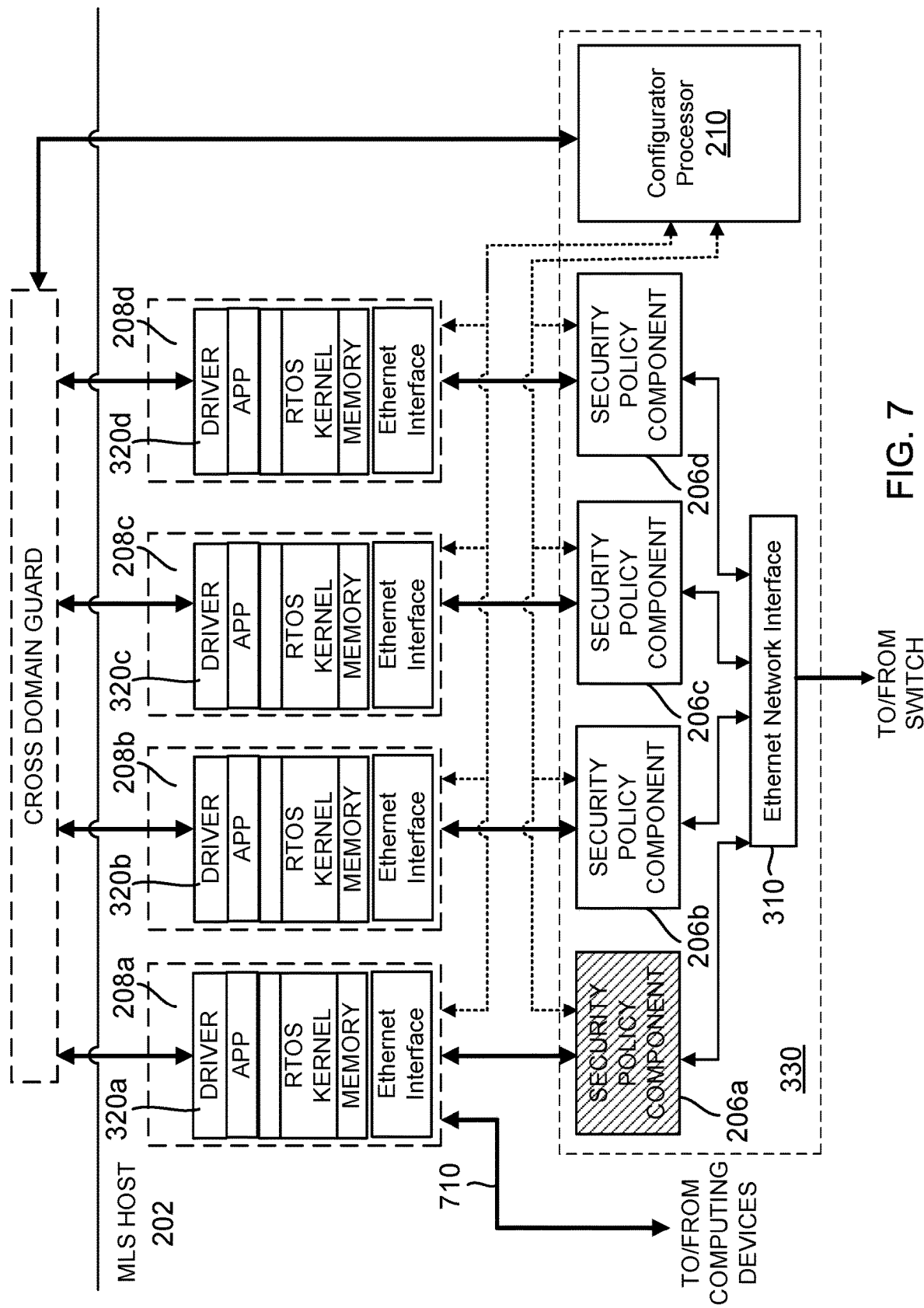
FIG. 7 is a block diagram of a multi-level security device with edge guard configuration according to an embodiment of the present disclosure.

FIG. 7 is a block diagram of a multi-level security device with edge guard configuration according to an embodiment of the present disclosure. MLS host 202 in FIG. 7 is similar to the one in FIG. 3, but for an edge guard interface 710 provided to security level processing unit 208a. Edge guard interface 710 may be a communication interface provided to receive communication from an enclave of network that has predetermined security level or standard. Edge guard interface 710 allows for communication to be received directly at security level processing unit 208a bypassing security policy component 206a in configurator unit 210. In some embodiments, security policy component 206a may be disabled. Because the communication received via edge guard interface 710 is assumed to only include data with a predetermined security level or standard from an isolated, non-labeled network, the security policy verification step at security policy component may be bypassed.

Figure 8:
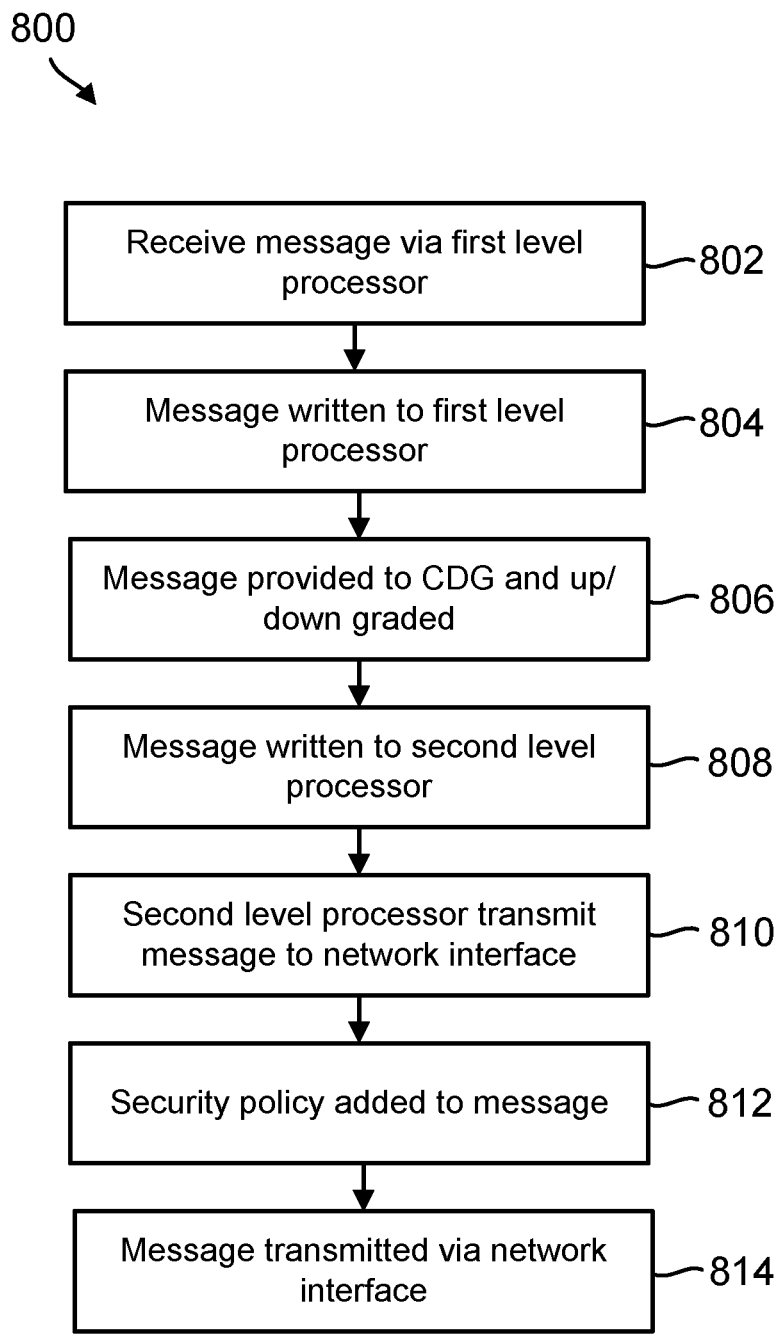
FIG. 8 is a flow chart illustrating a method for transmitting data between different security levels with edge guard configuration according to an embodiment of the present disclosure.

FIG. 8 is a flow chart illustrating a method 800 for transmitting data between different security levels with edge guard configuration according to an embodiment of the present disclosure. At step 802, a message from the enclave of network with predetermined security level or standard may be received directly at security level processing unit 208a, bypassing security policy component 206a of configurator unit 210. At step 804, the message may be written to independent hardware processor 320a, similar to step 610 in FIG. 6. At step 806, the message may be forwarded to CDG 204 to be filtered and up/down graded, similar to step 612 in FIG. 6. At step 808, the filtered message may be written to a second level processor designated to process data in the destination security level, similar to step 614 in FIG. 6. At step 810, the message may be forwarded from the second level processor to network interface 310. At step 812, a security policy component may add a security policy, e.g., a security label, to the message. The message may then be transmitted to the destination entity at step 814, similar to step 620 in FIG. 6.

Method 800 may allow messages to be received at MLS host 202 via edge guard interface 710, bypassing security policy components. This may allow an enclave of network with predetermined security level or standard to implement cross domain communication with improved efficiency and throughput.

Figure 9:
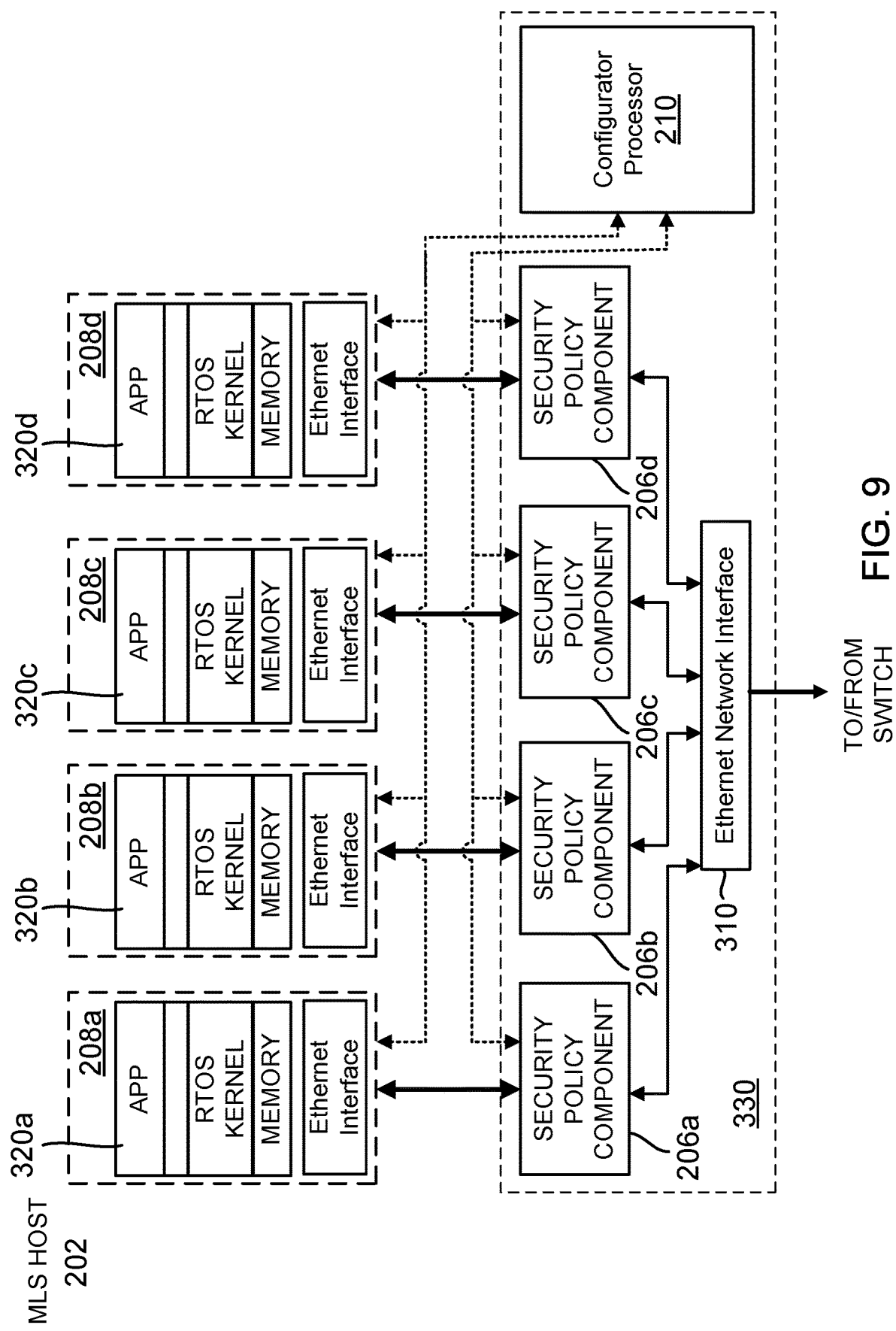
FIG. 9 is a block diagram of a multi-level security device with independent processing configuration according to an embodiment of the present disclosure.

FIG. 9 is a block diagram of a multi-level security device with independent processing configuration according to an embodiment of the present disclosure. MLS system 300 in FIG. 9 is similar to the one in FIG. 3, but without cross domain guard 204. In an independent processing configuration, data are communicated within the same security level (no cross domain communication). Thus, no CDG is needed to filter and up/downgrade messages between different security levels.

Figure 10:
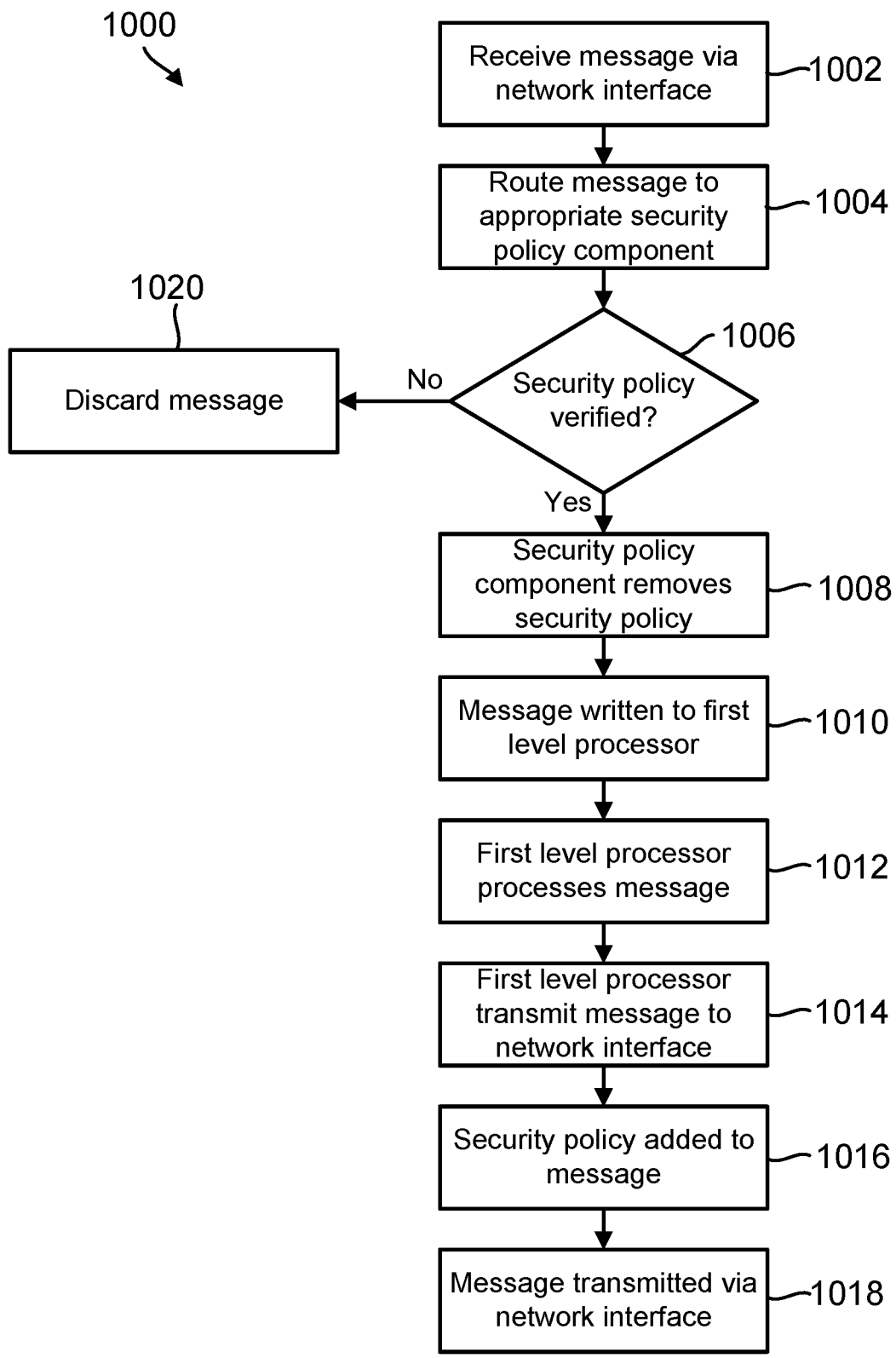
FIG. 10 is a flow chart illustrating a method for processing data separately in different security levels with independent processing without cross domain processing according to an embodiment of the present disclosure.

FIG. 10 is a flow chart illustrating a method 1000 for processing data separately in different security levels with independent processing configuration according to an embodiment of the present disclosure. At step 1002, MLS host 202 may receive a message, e.g., data packet, via network interface 310, similar to step 602 in FIG. 6. At step 1004, the message may be routed to an appropriate security policy component, similar to step 604 in FIG. 6. At step 1006, the security policy component may verify the security policy associated with the message, similar to step 606 in FIG. 6. If not verified, the security policy component may discard the message at step 1020 and may create an audit record in an audit log to record the error. If the security policy is verified at step 1006, the security policy component may remove the security policy, e.g., security label, included in the message at step 1008. At step 1010, the message may be written to the first level processor. First level processor may process the message at step 1012. At step 1014, the message may be forwarded to the network interface. At step 1016, security policy, e.g., security label, may be added to the message. At step 1018, the message may be transmitted to the receiving entity. Thus, in method 1000, the message is not routed through CDG. In contrast to method 600, no filtering or up/downgrading of message is performed in method 1000, because the messages are transmitted to and from the same security level.

Accordingly, components of a MLS host 202 may be provided on a compact circuit module to conserve space and reduce weight and power requirement. In particular, MLS host 202 may include multiple independent processors each designated for processing data from a particular security level to ensure that data from different security levels are processed separately. The multiple independent processors also allow for multiple instances of cross domain communication to be processed simultaneously. A configurator processor is provided in MLS host 202 to manage and monitor the operations of the multiple independent processors.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

The invention claimed is:

1. A system comprising:
    a first independent hardware processor configured to process data for a first vehicle designated with a first security level;
    a second independent hardware processor configured to process data for a second vehicle designated with a second security level different than the first security level; and
    a configurator hardware processor coupled to the first and second independent hardware processors, and configured to coordinate the first and the second independent hardware processors to process data being communicated between the first vehicle designated with the first security level and the second vehicle designated with the second security level to provide for a physical separation of the data processed by the first independent hardware processor for the first security level and the data processed by the second independent hardware processor for the second security level, wherein the system is configured to:
    receive by a communication interface of the first independent hardware processor a data packet from the first vehicle, the data packet designated for transmission to the second vehicle;
    process the data packet via the first independent hardware processor in the first security level before the data packet is filtered for the second security level; and
    filter the data packet between the first security level and the second security level and transmit the filtered data from the first independent hardware processor to the second independent hardware processor.

2. The system of claim 1, further comprising a single board computer, wherein the first independent hardware processor, the second independent hardware processor, and the configurator hardware processor are provided and connected to each other on the single board computer installed at the second vehicle.

3. The system of claim 1, wherein the system is further configured to:
    process the data packet via the second independent hardware processor in the second security level after the data packet is filtered for the second security level; and
    transmit from a communication interface of the second independent hardware processor the data packet to the second vehicle in the second security level.

4. The system of claim 3, wherein the first vehicle and the second vehicle are aircrafts communicating via a wireless communication.

5. The system of claim 3, further comprising a cross domain filter device configured to filter the data between the first security level and the second security level.

6. The system of claim 5,
    wherein the second security level has a different security requirement from the first security level, and
    wherein the cross domain filter device is configured to upgrade or downgrade data from the first security level to the second security level.

7. The system of claim 1, wherein the system further comprises:
    a network interface configured to receive data from one or more vehicles with different levels of security;
    a first security policy component coupled to the first independent hardware processor configured to process security policy of received data in the first security level; and
    a second security policy component coupled to the second independent hardware processor configured to process security policy of received data in the second security level.

8. The system of claim 1, further comprising a third independent hardware processor configured to process data in a third security level different than the first and second security levels, and a fourth independent hardware processor configured to process data in a fourth security level different than the first, second and third security levels.

9. The system of claim 1, wherein the configuration processor is further configured to verify configurations of the first and the second independent hardware processors in a device start-up process.

10. The system of claim 1, further comprising an edge network interface configured to receive secured data from a secured network and transmit the secured data directly to the first independent hardware processor bypassing a security policy component.

11. A method comprising:
    processing, by a first independent hardware processor, data for a first vehicle designated with a first security level;
    processing, by a second independent hardware processor, data for a second vehicle designated with a second security level different than the first security level;
    coordinating, by a configurator hardware processor coupled to the first and second independent hardware processors, the first and the second independent hardware processors to process data being communicated between the first vehicle designated with the first security level and the second vehicle designated with the second security level to provide for a physical separation of the data processed by the first independent hardware processor for the first security level and the data processed by the second independent hardware processor for the second security level;

receiving, by a communication interface of the first independent hardware processor, a data packet from the first vehicle, the data packet designated for transmission to the second vehicle;

processing, by the first independent hardware processor, the data packet in the first security level before the data packet is filtered for the second security level;

filtering the data packet between the first security level and the second security level and transmit the filtered data from the first independent hardware processor to the second independent hardware processor.

12. The method of claim 11, wherein the first independent hardware processor, the second independent hardware processor, and the configurator hardware processor are provided and connected to each other on a single board computer installed at the second vehicle.

13. The method of claim 11, further comprising:
processing, by the second independent hardware processor, the data packet in the second security level after the data packet is filtered for the second security level; and
transmitting, by a communication interface of the second independent hardware processor, the data packet to the second vehicle in the second security level.

14. The method of claim 13, wherein the first vehicle and the second vehicle are aircrafts communicating via a wireless communication.

15. The method of claim 13, further comprising filtering the data between the first security level and the second security level by a cross domain filter device.

16. The method of claim 15,
wherein the second security level has a different security requirement from the first security level, and
wherein the method further comprises upgrading or downgrading data from the first security level to the second security level by the cross domain filter device.

17. The method of claim 11, further comprising:
receiving, by a network interface, data from one or more vehicles with different levels of security;
processing security policy of received data in the first security level by a first security policy component coupled to the first independent hardware processor; and
processing security policy of received data in the second security level by a second security policy component coupled to the second independent hardware processor.

18. The method of claim 11, further comprising processing data in a third security level different than the first and second security levels by a third independent hardware processor and processing data in a fourth security level different than the first, second and third security levels by a fourth independent hardware processor.

19. The method of claim 11, further comprising verifying, by the configuration processor, configurations of the first and the second independent hardware processors in a device start-up process.

20. The method of claim 11, further comprising receiving, by an edge network interface, secured data from a secured network and transmitting the secured data directly to the first independent hardware processor bypassing a security policy component.

21. An aircraft comprising:
an aircraft avionic system configured to implement one or more operations of the aircraft; and
a multi-level security system comprising:
a first independent hardware processor configured to process data for a first aircraft designated with a first security level,
a second independent hardware processor configured to process data for a second aircraft designated with a second security level different than the first security level, and
a configurator hardware processor coupled to the first and second independent hardware processors, and configured to coordinate the first and the second independent hardware processors to process data being communicated between the first aircraft designated with the first security level and the second aircraft designated with the second security level to provide for a physical separation of the data processed by the first independent hardware processor for the first security level and the data processed for the second independent hardware processor for the second security level, wherein the system is configured to:
receive by a communication interface of the first independent hardware processor a data packet from the first vehicle, the data packet designated for transmission to the second vehicle;
process the data packet via the first independent hardware processor in the first security level before the data packet is filtered for the second security level; and
filter the data packet between the first security level and the second security level and transmit the filtered data from the first independent hardware processor to the second independent hardware processor.

22. The aircraft of claim 21, wherein the multi-level security system is provided with the avionic system disposed within a fuselage of the aircraft.

23. The aircraft of claim 21, wherein the multi-level security system is provided with an add-on system disposed exterior to a fuselage of the aircraft.

* * * * *